United States Patent
Littwitz et al.

(10) Patent No.: US 9,020,038 B2
(45) Date of Patent: Apr. 28, 2015

(54) SYSTEMS AND METHODS FOR STREAMING AND ARCHIVING VIDEO WITH GEOGRAPHIC ANCHORING OF FRAME CONTENTS

(75) Inventors: Elon Littwitz, Haifa (IL); Yehudit Oliker, Haifa (IL); Idan Adi, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 601 days.

(21) Appl. No.: 13/378,051

(22) PCT Filed: Jun. 14, 2010

(86) PCT No.: PCT/IB2010/052639
§ 371 (c)(1),
(2), (4) Date: Mar. 5, 2012

(87) PCT Pub. No.: WO2010/146522
PCT Pub. Date: Dec. 23, 2010

(65) Prior Publication Data
US 2012/0155547 A1    Jun. 21, 2012

(30) Foreign Application Priority Data
Jun. 14, 2009   (IL) ............................................. 199366

(51) Int. Cl.
*H04N 21/231*  (2011.01)
*H04N 21/266*  (2011.01)
*H04N 21/84*   (2011.01)

(52) U.S. Cl.
CPC ....... *H04N 21/231* (2013.01); *H04N 21/26603* (2013.01); *H04N 21/84* (2013.01)

(58) Field of Classification Search
CPC ................ H04N 21/231; H04N 21/84; H04N 21/26603; G06F 17/30247
USPC ........................................................ 375/240.18
See application file for complete search history.

(56) References Cited

U.S. PATENT DOCUMENTS

| | | | |
|---|---|---|---|
| 6,282,362 | B1 | 8/2001 | Murphy et al. |
| 6,411,724 | B1 * | 6/2002 | Vaithilingam et al. ........ 382/100 |
| 6,504,571 | B1 | 1/2003 | Narayanaswami et al. |
| 6,741,790 | B1 | 5/2004 | Burgess |
| 2002/0122564 | A1 | 9/2002 | Rhoads et al. |
| 2006/0251321 | A1 | 11/2006 | Kryeziu |
| 2006/0294146 | A1 * | 12/2006 | Burnett ..................... 707/104.1 |
| 2009/0012995 | A1 * | 1/2009 | Sartor et al. ............... 707/104.1 |
| 2009/0276711 | A1 * | 11/2009 | Figueroa ...................... 715/719 |
| 2010/0067734 | A1 * | 3/2010 | Rhoads ......................... 382/100 |

* cited by examiner

*Primary Examiner* — Jay Patel
*Assistant Examiner* — Francis G Geroleo
(74) *Attorney, Agent, or Firm* — Mark M. Friedman

(57) ABSTRACT

A system and method for generating compressed video with geographically-anchored-video functionality includes processing frames from a source video sequence by matching image content of the frames to image data from a geographic database to derive the geographic locations of pixels within at least part of the frames. The source video sequence is then compressed by a lossy video compression technique to generate a compressed video sequence, and the compressed video sequence is encoded together with data indicative of the geographic locations of pixels as a composite data stream. Also disclosed are methods for selective video archiving and retrieval based on the geographical footprint of the image content.

14 Claims, 4 Drawing Sheets

SYSTEMS AND METHODS FOR STREAMING AND ARCHIVING VIDEO WITH GEOGRAPHIC ANCHORING OF FRAME CONTENTS

FIELD AND BACKGROUND OF THE INVENTION

The present invention relates to systems and methods for streaming and archiving video with geographic anchoring of frame contents.

It is known to provide geographical information relating to the location at which still or video images were sampled, and in some cases, to incorporate the location information as metadata within the image or video data. This technology is commonly referred to as "go-tagging", and allows the resulting media to be associated with corresponding locations on a map. Examples of this technology may be found in U.S. Pat. Nos. 6,282,362, 6,504,571, 6,741,790 and 7,042,470.

The location data for the aforementioned geo-tagging of video is typically derived from sensors associated with the imaging device, such as GPS sensors, inertial sensors and/or inclination sensors. Such sensors provide various levels of precision as to the location of the imaging device, and possibly also the direction in which the imaging device is facing, but do not provide accurate information about the geographical coverage of the video content. Thus, for example, if a user of a database wishes to view video of a specific geographical location, the user may need to sift through many videos taken from locations which theoretically could have viewed the location of interest including videos which were taken from nearby locations but not facing in the correct direction.

Even if geo-tag data were supplemented with information about the pointing direction of the imaging device, the actual content of the images is very sensitive to angular precision. Even a small angular error in the pointing direction can result in a major inaccuracy in the geographic area which is visible in the images. This is particularly true in situations where narrow field-of-view optics is used to view distant objects, as is common in the field of military reconnaissance and surveillance.

In military applications, it is known to employ real-time scene matching technology to correlate information in viewed images with images from a geographic database, thereby determining the geographic coordinates of each point viewed in a sampled image. In other words, each pixel of each image is effectively mapped to a corresponding geographic location. This allows reliable identification of points of interest and transfer of geographically-linked information between platforms viewing a region from different viewing directions. The scene matching processing is computationally heavy, and requires access to an extensive infrastructure of reference images. As such, it cannot readily be repeated on demand for re-use of the video in other locations or at a later time.

Military systems are today highly network based, and it may be advantageous to make video sampled from a remote sensor available at various different locations in a network. In most cases however, due to bandwidth and processing capacity limitations, it is not feasible to provide the functionality of geographic anchoring of the images at multiple locations. Specifically, the scene matching processing used to achieve geographic anchoring of the scene contents typically requires that the original full-resolution image data, uncompressed or compressed only by "lossless" techniques, be available to ensure reliable results. The bandwidth available in most networks, and particularly in wide area networks (WAN), typically prohibits transfer of such uncompressed or minimally compressed data. After compression by high compression ratio lossy techniques for network transmission, the data is typically insufficient to perform reliable scene matching for geographic anchoring.

There is also a need to provide for storage and retrieval of video sampled from multiple sources according to the geographical coverage of the video, The above-mentioned U.S. Pat. No. 6,504,571 discloses a system and method for querying a digital image database based on various parameters including geographic location data. Here again, since the indexing of the video is based on the location of the imaging device, there is a wide margin of uncertainty regarding the geographical content of each image, leading to location mismatches between a requested location and coverage of video sequences retrieved from a database. The user typically has no way of knowing whether a particular location of interest is included within the video or not without checking all videos recorded within a certain range of the location of interest, or at least, a large subset of such videos which were taken in the right general direction. In the case of a large database, such a task may be impractical There is therefore a need for a system and method for facilitating transmission and use of video sequences which would include precise geographical anchoring of the video frame content. It would also be advantageous to provide a system and method for storage and retrieval of video on demand based upon accurate indexing of the geographical coverage of the content of the video frames.

SUMMARY OF THE INVENTION

The present invention relates to systems and methods for streaming and archiving video with geographic anchoring of frame contents.

According to an aspect of the present invention there is provided, a method comprising the steps of (a) processing frames from a source video sequence by matching image content of the frames to image data from a geographic database to derive the geographic locations of pixels within at least part of the frames; (b) compressing the source video sequence by a lossy video compression technique to generate a compressed video sequence; and (c) encoding the compressed video sequence together with data indicative of the geographic locations of pixels as a composite data stream.

According to a further aspect of the present invention, the data indicative of the geographic locations includes parameters of a transformation for mapping between image content of the frames and the geographic database.

According to a further aspect of the present invention, the data indicative of the geographic locations includes at least part of an elevation map.

According to a further aspect of the present invention, the data indicative of the geographic locations for a subset of the frames includes data for defining geographic locations relative to geographic locations defined in others of the frames.

According to a further aspect of the present invention, the composite data stream is a video data format including metadata.

According to a further aspect of the present invention, the source video sequence is a real-time video sequence output by a video sensor, the method further comprising transferring the composite data stream, over a wide area network as a substantially real-time video sequence for providing geographically-anchored-video functionality at a remote location.

According to a further aspect of the present invention, there is also provided: (a) storing at least part of the compressed video sequence in an image database; and (b) generating at least one indexing entry associated with at least one frame of the compressed video sequence, the indexing entry including a geographical footprint of the at least one frame of the compressed video sequence derived from the data indicative of the geographic locations of pixels, thereby allowing retrieval of frames from the database based on image content location.

According to a further aspect of the present invention, there is also provided: (a) defining a set of rules for selective storage of video data in an image database, the set of rules including at least one rule relating to geographic location of image content; (b) employing the data indicative of the geographic location of pixels to evaluate a result of applying the at least one rule relating to geographic location of image content to the compressed video sequence; and (c) dependent at least upon the result, storing at least part of the compressed video sequence in the image database.

There is also provided according to a further aspect of the present invention, a system comprising: (a) an image processor having an input for receiving frames of a source video sequence from a video source, the image processor being configured to process the frames by matching image content of the frames to image data from a geographic database to derive the geographic locations of pixels within at least part of the frames; and (b) an encoder in data communication with the image processor and configured to: (i) compress the source video sequence by a lossy video compression technique to generate a compressed video sequence; and (ii) encode the compressed video sequence together with data indicative of the geographic locations of pixels as a composite data stream.

There is also provided according to a further aspect of the present invention, a data product comprising: (a) a compressed video format containing a compressed video sequence derived by compression of a source video sequence by a lossy compression technique; and (b) data combined with the video sequence as part of a composite data stream, the data being indicative of geographic locations of pixels within at least part of frames of the compressed video sequence as derived by matching image content of frames of the source video to image data from a geographic database.

There is also provided according to a further aspect of the present invention, a method comprising the steps of: (a) receiving a composite data stream comprising: (i) a compressed video format containing a compressed video sequence derived by compression of a source video sequence by a lossy compression technique, and (ii) data indicative of geographic locations of pixels within at least part of frames of the compressed video sequence as derived by matching image content of frames of the source video to image data from a geographic database; (b) displaying the compressed video sequence to a user; (c) receiving from the user in input indicative of a position within the displayed video; and (d) employing the data to derive a geographical location corresponding to the position within the displayed video.

There is also provided according to a further aspect of the present invention, a method comprising the steps of (a) processing frames from a source video sequence by matching image content of the frames to image data from a geographic database to derive the geographic locations of pixels within at least part of the frames, and hence a geographical footprint of at least one of the frames; (b) compressing the source video sequence by a lossy video compression technique to generate a compressed video sequence; (c) storing at least part of the compressed video sequence in an image database; and (d) generating at least one indexing entry associated with at least one frame of the compressed video sequence, the indexing entry including the geographical footprint of at least one frame of the compressed video sequence, thereby allowing retrieval of frames from the database based on image content location.

There is also provided according to a further aspect of the present invention, a database comprising: (a) a main database containing a plurality of compressed video sequences derived by compression of source video sequences by a lossy compression technique; and (b) a database index including at least one indexing entry associated with at least one frame of the compressed video sequences, the indexing entry including a geographical footprint of at least one frame of the compressed video sequence derived by matching image content of frames of the source video sequence to image data from a geographic database, thereby allowing retrieval of frames from the database based on image content location.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
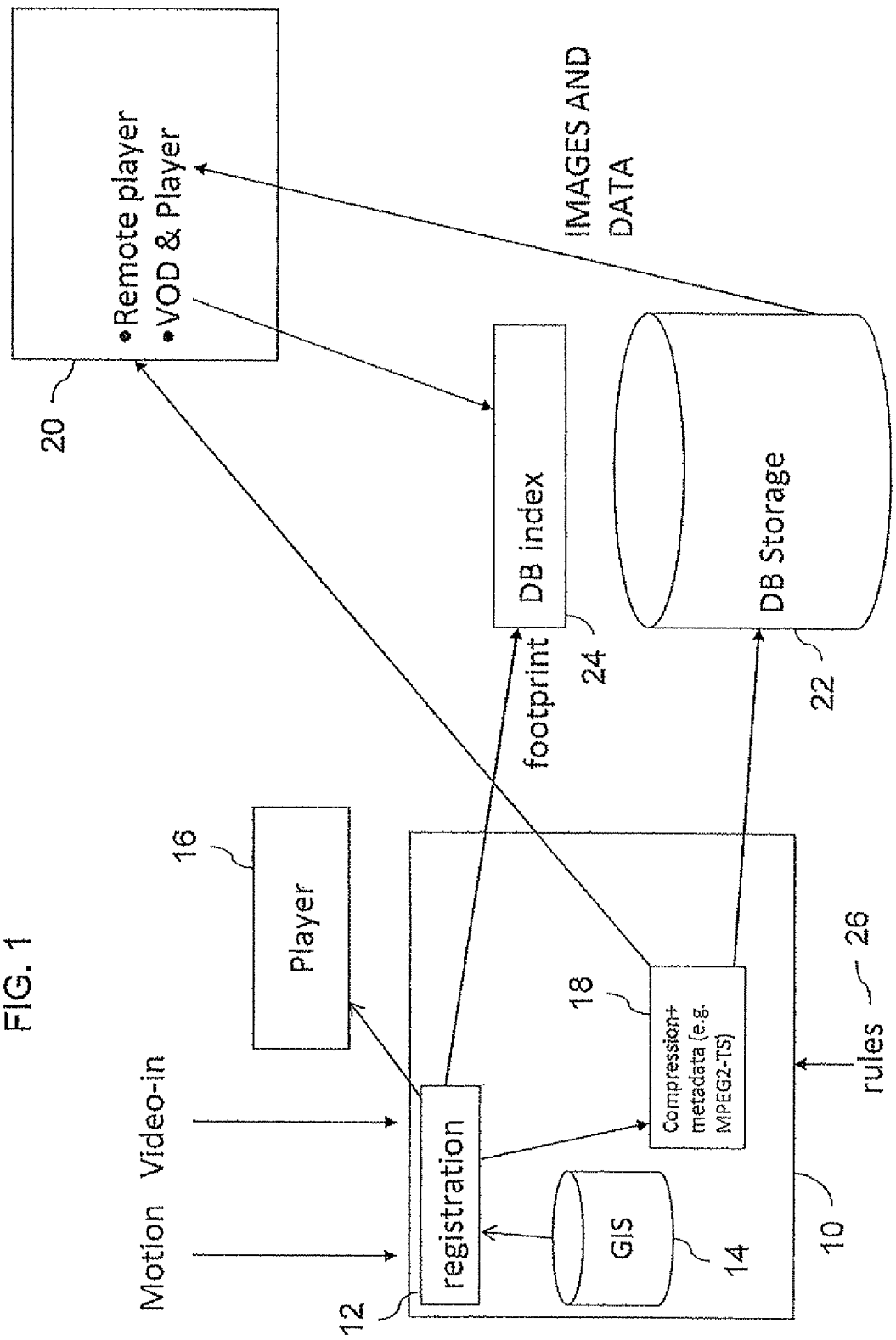
FIG. 1 is a schematic overview of a system, constructed and operative according to an, embodiment of the present invention, and for implementing a method according to the present invention.

The present invention has a number of aspects, each of patentable significance in its own right, which relate to transmission, storage, retrieval and/or display of images (still or video sequences) which is tied to geographic information.

A first aspect of the invention relates to a method, system and corresponding data structure for encoding images, preferably video sequences, with information sufficient to define the geographic coverage of the content of the images. A second aspect of the present invention relates to an image storage and/or searching system and method which enables selective retrieval of images of a desired geographical location. Both of these aspects will be described by reference to FIG. I which shows an overview of a system 10 for implementing an embodiment of the present invention combining these two aspects. In this context, it is important to distinguish between information relating to camera position and information relating to the content of the images. As pointed out above, tagging of images with the camera position can give a general indication of where the images were taken, but is insufficient to accurately and reliably identify the geographic coverage of the images. According to preferred implementations of this aspect of the invention, the information for encoding within the video sequence is derived from registration of the images by a registration module 12, directly or via an intermediate reference image, to images of a geographic image database 14, thereby giving an accurate and reliable indication of the actual geographical coverage of the image.

The resulting registration data may be provided together with the video to a local player 16, corresponding to the existing functionality of on-site geo-registered video, However, an embodiment of the present invention makes this same functionality available at a remote site by encoding geographical coverage information together with a compressed video data stream at encoder 18, all as described in more detail below.

The inclusion of this geographical coverage information encoded within the video sequence renders the video sequence "portable" in the sense that the geographical information becomes available to a subsequent recipient of the video sequence without the recipient necessarily requiring access to the geographic database infrastructure, intermediate reference images or scene-matching processing systems. Furthermore, the video sequence can then be compressed using high compression ratio lossy compression techniques, such as the various MPEG standards, for network transmission while maintaining the functionality of a geo-registered video sequence. The video sequence can then be used in many different ways, and in many different contexts, some of which will be detailed below in the context of additional aspects of the present invention. As a brief non-exclusive list, the video sequence encoded according to this aspect of the present invention may be transmitted to one or more remote viewing station (at remote player 20) where various interactive functionality relating to geographical location within the images can be provided (in a manner similar to the real-time on-site displays of military systems described above, optionally substantially in real time), it may be stored in a database 22 for retrieval (the entire sequence, selected clips or individual frames) according to a geographical location based query, and it may be input into any other system for further processing based on the geographical anchoring of the image content.

As will be clear to one ordinarily skilled in the art, the information defining the geographic coverage of the content of the images can be provided in various different forms. The information is preferably sufficient to determine geographic location on a pixel-by-pixel basis within the image. In one preferred example, the information may include parameters of a transformation which maps each pixel (or group of pixels) to a geographical location. Alternatively, geographical coverage of an image may be defined by a small number of geographically anchored points (typically, pixels) for the image. Typically, four points are sufficient. The transformation or anchor point locations are typically used together with information about the relief of the terrain (for example, a digital terrain map ("DTM") or a digital model of an urban landscape). This relief information may be provided to the end user from a separate source (geographic database). Alternatively, in some implementations, the relief information may be included as metadata also embedded in the video sequence.

Optionally, the information for defining the geographic coverage of the content of the images may be encoded for certain frames by definition relative to another frame. For example, optical flow or feature tracking techniques may be used to link pixels of one frame to corresponding features of a nearby frame which are themselves anchored by one of the above techniques.

Most preferably, each frame of the video sequence is provided with geographical anchoring information (e.g., transformation parameters, specific geographic information and optionally additional information about the video content), although implementations in which anchoring information is provided only for intermittent frames also fall within the scope of the present invention. In the latter case, the geographically anchored frames may be at fixed intervals, or may be chosen according to any other criteria, for example, when the overlap with the previous anchored frame falls below a certain level. If so desired, the use of such criteria may facilitate reconstruction of geographic data for the intervening frames based on techniques such as optical flow or feature tracking performed at the playback device. These techniques are computationally relatively light.

Figure 2:
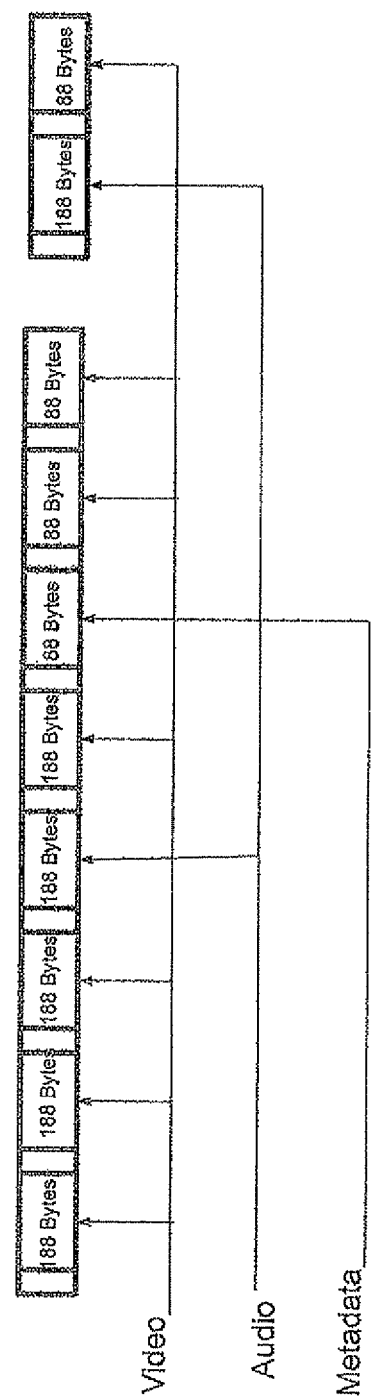
FIG. 2 is a block diagram of an MPEG transport stream multiplexing with metadata useful for implementing the present invention.

As mentioned above, the information for defining the geographic location of the content of the images is preferably encoded within the data structure of the video sequence itself. Clearly, a wide range of data structures could be used for encoding the images (frames) of the video sequence together with the additional information of the invention. According to one particularly preferred but non-limiting example, a standard format of a type allowing insertion of metadata is used. An example of such a format is MPEG2-TS or MPEG4-TS with "private streams" (see FIG. 2).

A method and system for generating video sequences encoded according to this aspect of the present invention typically includes components for performing the registration process to generate a transformation mapping images to geographically anchored reference images. Such systems are well known in the art, and are described for example in the following patent publications: IL 111069, U.S. Pat. No. 7,136,059, WO 2007/135671, and US 2007/0027591. In addition, the system preferably includes additional processing modules, where required, for converting the derived frame-to-reference transformation into the data type and format required. Optionally, as will be discussed below, the system may also generate a separate output of the geographical footprint of some or all of the images, and a corresponding index sufficient to identify the image, for storage in database index 24. The source for the video sequences processed may be real-time sampled video, or may be prerecorded video from any source.

Turning now to a second aspect of the present invention, this relates to an image storage and/or searching system and method which enables selective retrieval of images of a desired geographical location. Here too, the method is based upon identification of the geographical location of the image content. For particularly concise and accurate geographical indexing of images, an index 24 is preferably assembled containing a geographical "footprint" for each indexed image. In certain preferred implementations, the footprint is defined by a polygon, typically a rectangle, trapezoid or trapezium, which corresponds substantially to the geographical area covered by the image. In some cases, particularly for shallow-angle images, parts of the image in the far-field, i.e., with low spatial resolution, may be excluded from the polygon of the indexed footprint. In certain preferred embodiments, the definition of the footprint may be simplified to a standardized polygon, for example a rectangle, inset within the full footprint, and corresponding to the central frame or otherwise defined primary region of coverage of the image.

Figure 4:
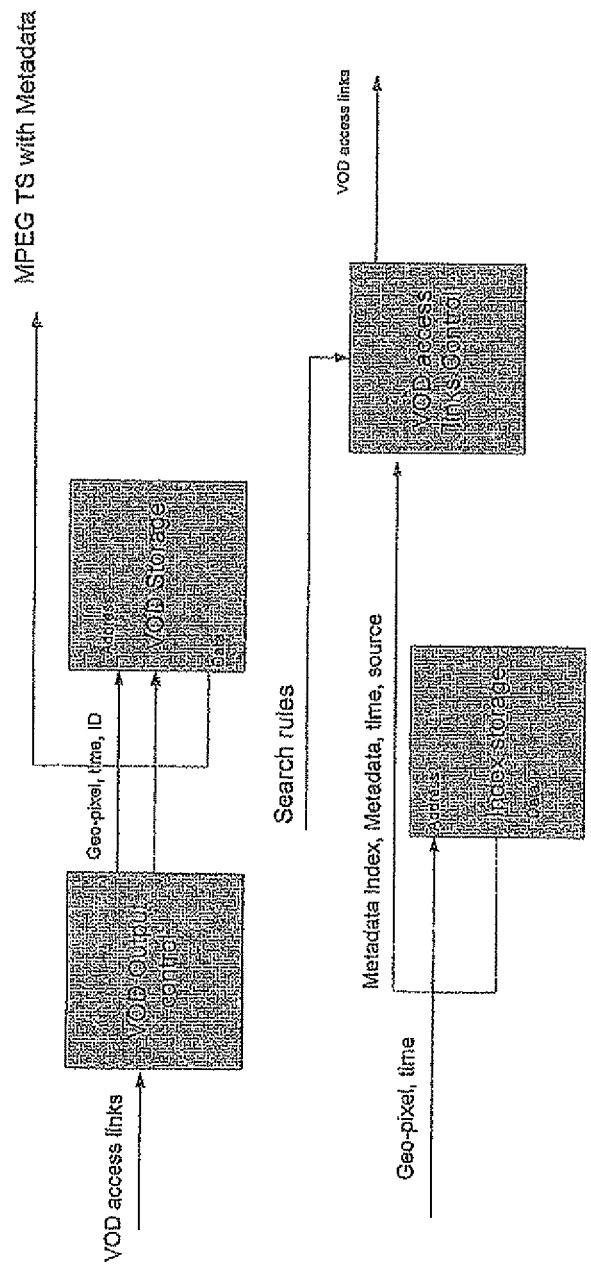
FIG. 4 is a block diagram for video and frames retrieval from a VOD system according to a further aspect of the present invention.

By maintaining such an index of image footprints, it becomes possible to send a query from remote player 20 to search index 24 and retrieve from an associated database, or from any of a plurality of storage devices covered by the index, any or all images which include a specific location of interest within their footprint area for viewing on remote player 20. An example of such a video-on-demand query is illustrated schematically in FIG. 4. In contrast to systems mentioned in the background section above which are based on camera location tagging, an image returned as matching the required location according to this aspect of the invention is known to have the location of interest within its footprint. This makes it possible to pinpoint images of a certain location, building or other point of interest within a store of images so large that it would otherwise be impractical to search by camera location alone.

Clearly, a search for images taken of a given location may be qualified by various additional criteria. To this end, the index preferably also includes various additional searchable data. For example, the index may advantageously contain any one or more of the following types of data associated with the image identifiers and footprint data: time and date on which the image was taken; camera location and/or other data allowing searching for views from a given direction (for example, the front or back of a building); image resolution data; image quality data; and type of imaging sensor used (for example, thermal images or visible light images).

Footprint indexing is preferably done on a frame-by-frame basis, or at least for intermittent frames distributed through a video sequence, thereby allowing selective retrieval or selective viewing of relevant frames from within an extended video sequence. It should be noted however that indexing of video sequences as a unit also falls within the scope of the present invention and may be preferred in certain circumstances. Where a video sequence is indexed as a unit, it is typically preferable to generate a combination footprint which indicates the geographical area covered by the entirety of the sequence, or an approximation thereto.

Generation of the footprint data may be performed in any suitable manner, as will be understood by one ordinarily skilled in the art. According to a first option, the footprint data is generated directly by the image registration system described above and provided as a separate output. Alternatively, a separate indexing processor module may be used to derive the footprint information from the frame content location encoded video stream described above.

Figure 3:
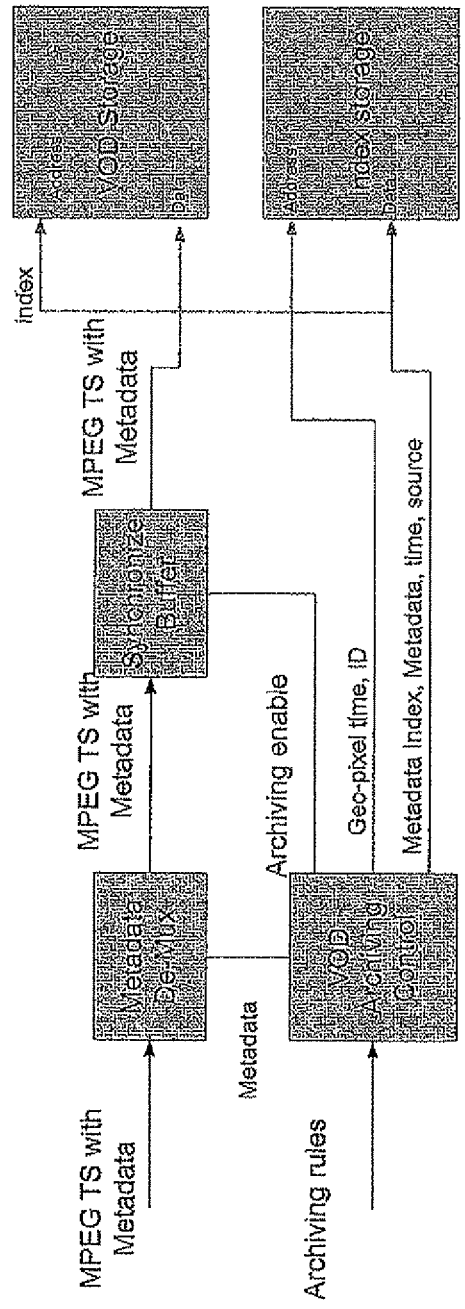
FIG. 3 is a block diagram of selectice VOD archiving according to an aspect of the present invention.

It will be noted that the footprint may also be a useful tool in management of a large image database, allowing implementation of a range of rules 26 for selective storage or prioritizing database content. For example, the footprints can be processed to determine what frames include information relating to locations or regions of interest and to selectively store such frames only. According to another example, the footprints can be used to eliminate excessive redundancy of data, and optionally to discard frames whose content has been superseded by one or more subsequently added frames. Since footprint information is available for each frame, such rules can be tailor made in a highly specific manner, for example, keeping all historical data for geographical locations of particularly high priority, some lesser degree of coverage (e.g., most up-to-date information only, or highest resolution information only, or earliest plus latest data) for regions of lesser interest. An example of a selective archiving process according to an aspect of the present invention is illustrated schematically in FIG. 3. Many other such variants will be clear to one ordinarily skilled in the art.

It will be appreciated that the above descriptions are intended only to serve as examples, and that many other embodiments are possible within the scope of the present invention as defined in the appended claims.

What is claimed is:

1. A method comprising the steps of:
   (a) processing frames from a source video sequence by matching image content of said frames to image data from a geographic database to derive the geographic locations of pixels within at least part of said frames;
   (b) compressing said source video sequence by a lossy video compression technique to generate a compressed video sequence; and
   (c) encoding said compressed video sequence together with data indicative of said geographic locations of pixels as a composite data stream,
   wherein said data indicative of said geographic locations includes:
   (i) a geographically registered elevation map selected from the group consisting of: a digital terrain map and a digital model of an urban landscape, and
   (ii) at least four geographically anchored reference points per frame associating a pixel of said frame with a location in said geographically registered elevation map.

2. The method of claim 1, wherein said composite data stream is a video data format including metadata.

3. The method of claim 1, wherein said source video sequence is a real-time video sequence output by a video sensor, the method further comprising transferring said composite data stream over a wide area network as a substantially real-time video sequence for providing geographically-anchored-video functionality at a remote location.

4. The method of claim 1, further comprising:
   (a) storing at least part of said compressed video sequence in an image database; and
   (b) generating at least one indexing entry associated with at least one frame of said compressed video sequence, said indexing entry including a geographical footprint of the, at least one frame of said compressed video sequence derived from said data indicative of said geographic locations of pixels, thereby allowing retrieval of frames from said database based on image content location.

5. The method of claim 1, further comprising:
   (a) defining a set of rules for selective storage of video data in an image database, said set of rules including at least one rule relating to geographic location of image content;
   (b) employing said data indicative of said geographic location of pixels to evaluate a result of applying said at least one rule relating to geographic location of image content to said compressed video sequence; and
   (c) dependent at least upon said result, storing at least part of said compressed video sequence in said image database.

6. The method of claim 1, wherein said at least four geographically anchored reference points denote geographical locations at least partially defining a polygon corresponding to a geographical region visible in said frame.

7. A system comprising:
   (a) an image processor having an input for receiving frames of a source video sequence from a video source, said image processor being configured to process said frames by matching image content of said frames to image data from a geographic database to derive the geographic locations of pixels within at least part of said frames; and
   (b) an encoder in data communication with said image processor and configured to:
   (i) compress said source video sequence by a lossy video compression technique to generate a compressed video sequence; and
   (ii) encode said compressed video sequence together with data indicative of said geographic locations of pixels as a composite data stream.
   wherein said data indicative of said geographic locations includes:
   (A) a geographically registered elevation map selected from the group consisting of: a digital terrain map and a digital model of an urban landscape, and (B) at least four geographically anchored reference points per frame associating a pixel of said frame with a location in said geographically registered elevation map.

8. The system of claim 7, wherein said at least four geographically anchored reference points denote geographical locations at least partially defining a polygon corresponding to a geographical region visible in said frame.

9. A data product comprising:
(a) a compressed video format containing a compressed video sequence derived by compression of a source video sequence by a lossy compression technique: and
(b) data combined with said video sequence as part of a composite data stream, said data being indicative of geographic locations of pixels within at least part of frames of Said compressed video sequence as derived. by Matching image content of frames. of said source video to image data from a geographic database.
wherein said data indicative of said geographic locations includes:
(i) a geographically registered elevation map selected from the group consisting of: a digital terrain map and a digital model of an Urban landscape, and
(ii) at least four geographically anchored reference points per frame associating a pixel of said frame with a location in said geographically registered elevation map.

10. The data product of claim 9, wherein said at least four geographically anchored reference points denote geographical locations at least partially defining a polygon corresponding to a geographical region visible in said frame.

11. A method comprising the steps of:
(a) receiving a composite data stream comprising:
(i) a compressed video format containing a compressed video sequence derived by compression of a source video sequence by lossy compression technique, and
(ii) data indicative of geographic locations of pixels within at least part of frames of said compressed video sequence as derived by matching image content of frames of said source video to image data from a geographic database,
wherein said data indicative of said geographic locations includes;
(A) a geographically registered elevation map selected from the group consisting of: a digital terrain map and a digital model of an urban landscape, and
(B) at least four geographically anchored reference points per frame associating a pixel of said frame with a location in said geographically registered elevation map;
(b) displaying said compressed video sequence to a user;
(c) receiving from the user an input indicative of a position within the displayed video; and
(d) employing said data to derive a geographical location corresponding to said position within the displayed video.

12. The method of claim 11, wherein said at least four geographically anchored reference points denote geographical locations at least partially defining a polygon corresponding to a geographical region visible in said frame.

13. A method comprising the steps of:
(a) processing frames from a source video sequence by matching image content of said frames to image data from a geographic database to derive the geographic locations of pixels within at least part of said frames, and hence a geographical footprint of at least one of said frames said geographical footprint being defined by at least four geographically anchored reference points per frame, each of said reference points associating a pixel of said frame with a geographical location, said reference points at least partially defining a polygon corresponding to a geographical region visible in said frame:
(b) compressing said source video sequence by a lossy video compression technique to generate a compressed video sequence;
(c) storing at least part of said compressed video sequence in an image database; and
(d) generating at least one indexing entry associated with at least one frame of said compressed video sequence, said indexing entry including said geographical footprint of at least one frame of said compressed video sequence, thereby allowing retrieval of frames from said database based on image Content location.

14. A database comprising:
(a) a main database containing a plurality of compressed video sequences derived by compression of source video sequences by a lossy compression technique: and
(b) a database index including at least one indexing entry associated with at least one frame of said compressed video sequences, said indexing entry including a geographical footprint of at least one frame of said compressed video sequence derived by matching image content of frames of said source video sequence to image data from a geographic database, said geographical footprint being defined by at least four geographically anchored reference points per frame. each of said reference points associating a pixel of said frame with a geographical location, said reference points at least partially defining a polygon corresponding to a geographical region visible in said frame. thereby allowing retrieval of frames from said database based on image content location.

* * * * *